United States Patent Office 3,370,530
Patented Feb. 27, 1968

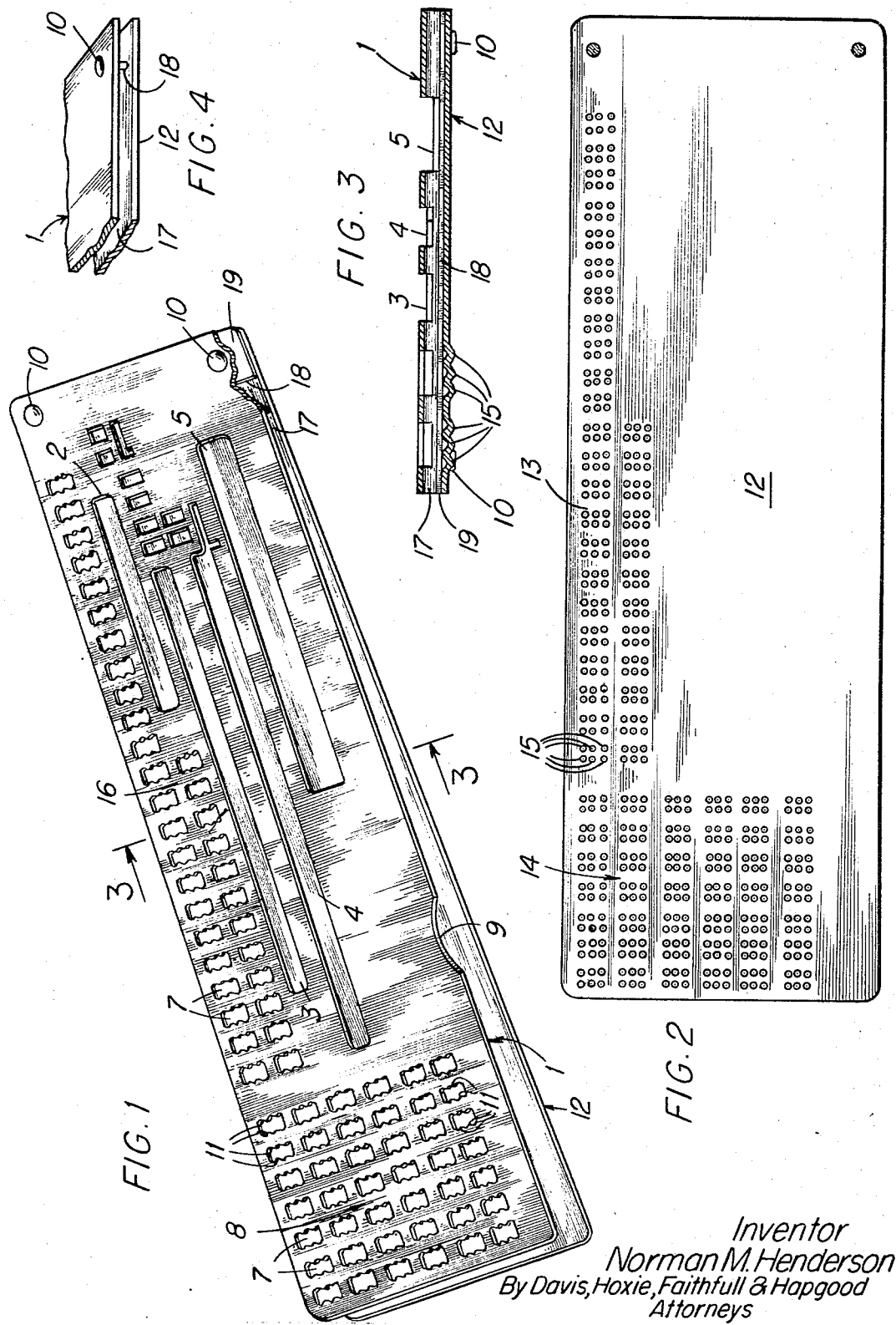

3,370,530
BRAILLE CHECKWRITER
Norman M. Henderson, Upper Montclair, N.J., assignor to Chemical Bank New York Trust Company, New York, N.Y., a corporation of New York
Continuation-in-part of application Ser. No. 415,672, Dec. 3, 1964. This application July 12, 1967, Ser. No. 652,979
5 Claims. (Cl. 101—3)

ABSTRACT OF THE DISCLOSURE

A device for assisting blind persons in writing checks and maintaining checking account records, providing guide means for both longhand and Braille writing, and including means of locating and entering longhand information on the proper areas of the check.

Cross reference to related application

This application is a continutation-in-part of Ser. No. 415,672, filed Dec. 3, 1964, in the name of Norman M. Henderson, now abandoned.

Background of the invention

This application relates to apparatus for the writing of checks by blind people.

The blind person by the nature of his handicap has difficulty in completing form items such as checks. Checks, in particular, require the placement of information in a stylized location. In addition, once the information is written and the check is negotiated the blind person is unable to sort and file the cancelled check without the assistance of a sighted person.

It is the purpose of this invention to both aid a blind person in placing the regularly required information on his checks and, at the same time, to provide means for impressing information on the checks which will be retrievable by him without the aid of a sighted person. One of the greatest psychological handicaps faced by a blind person is a lack of privacy in his affairs, particularly, his financial affairs. The present invention will permit a blind person to manage his own accounts with a minimum of assistance from another.

Summary of the invention

The device of my invention consists of two rectangular plates fastened together at one end and corresponding in at least one outside dimension to the corresponding dimension of the check with a stub attached at its end with which check the Braille Checkwriter is to be used. The top, or pattern plate, has a series of apertures which correspond to the locations of the normal information placed on a check and of sufficient size to allow the information to be written in the space. The bottom plate fits below the check and provides a flat impression surface for the conventionally written portion. The plates are fastened together in such a manner that there is a separation between the plates of slightly more than the thickness of the check with which the checkwriter is to be used. Stop means are provided at the fastened side of the plates, to assist the blind person in aligning his check with the checkwriter by butting an edge of the check against the stop means.

In addition, small apertures are provided through the top plate above the conventional spaces and a further set through the portion corresponding to the check stub. Each of these smaller apertures are of a rectangular shape with six notches provided around their periphery. Further, six depressions are provided in the bottom plate below each of the small rectangular apertures of the upper plate so that the point of a stylus placed near the correct position in the top plate will be guided to and impress the face of the check forming a raised or embossed dot on the back of the check. These dots correspond to the conventional Braille pattern. The blind person will therefore be able to "read" both his check and his stub while a sighted person can read the conventional longhand information when the check is negotiated.

The invention will be explained in greater detail below and in the drawings.

Brief description of the drawings

FIG. 1 is a perspective view of the top of my invention;

FIG. 2 is a plan view of the top side of the bottom plate of the invention;

FIG. 3 is a section along line 3—3 of FIG. 1 showing the top and bottom plates; and FIG. 4 is a partial perspective view of the top of my invention, showing alternative stop means.

Description of the preferred embodiment

Referring to FIG. 1, a top pattern plate 1 has one outside dimension, the width, corresponding to a check and its attached end-stud with which the Braille Checkwriter is to be used. Plate 1 has a series of apertures in its surface at various locations. When the plate is placed over and aligned with a check and its stub, aperture 2 corresponds to the location of the date. Aperture 3 is the place where the payee is written. Aperture 4 is the location of the amount and aperture 5 corresponds to the location of the signature. These apertures are of sufficiently large size to allow a blind person to write by longhand therein.

Located along the top edge of plate 1 in the space 16 above the written portion of the check are a series of small rectangular apertures 7. These apertures have three notches 11 on each of their long sides and the size of the apertures corresponds to the conventional size of a Braille character.

A further series of such apertures 7 is located in space 8 and corresponds to the location of the check stub. Plate 12 is the bottom pattern plate and is attached by rivets 10 to the top plate 1. The surface of the plate 12 is smooth in those areas that correspond to apertures 2, 3, 4, 5 of top plate 1. In the spaces on plate 12 that are located below the small apertures 7 on plate 1, are a series of groups of six depressions or indentations 15. Those located in area 13 are beneath and correspond in location to the apertures 7 in space 16 which appear above the top portion of the check, while those in area 14 are below the corresponding apertures 7 in space 8 which appear above the check stub. Top plate 1 and bottom plate 12 are separated at the edge where they are joined by a space 17, the space being slightly larger than the thickness of a single check, so that a check may be easily placed between the pattern plates. The space 17 is created by placing a thin spacer 19 between the plates 1 and 12 at the edge on which said plates are joined, and joining plates 1 and 12, by means of rivets 10 passing first through plate 1, through spacer 19, and then through plate 12. Alternatively, space 17 may be created by temporarily placing a shim between plates 1 and 12 in the region immediately adjacent to where said plates are to be joined, prior to joining said plates with rivets 10. After the plates 1 and 12 are joined, the shim may be removed, leaving plates 1 and 12 spaced apart without requiring a spacer 19, as shown in FIGURE 4.

A stop means 18 is provided near the edge where plates 1 and 12 are joined, the stop means 18 being located a precise distance from each of the apertures 2, 3, 4 and 5, the exact distances being determined by the particular check form with which the Braille Checkwriter is to be used. The stop means 18 may be an edge of spacer 19 when such a spacer is used; or if no spacer 19 is used, the side of rivets 10 may be used as stop means 18.

In operation, a blind person places a check attached to its stub and to the checkbook between plates 1 and 12, with plate 1 on top. The check is moved in between plates 1 and 12 until the side of the check contacts stop means 18. Other sides of the check are aligned with the corresponding edges of a pattern plate by sliding the fingertips along the edges of the plate. The apertures 2, 3, 4 and 5 are now located in position over the places on the check where they act as guides for the blind person in writing in longhand, respectively, the date, payee, amount and signature. The person then takes a pointed stylus and impresses the check in the conventional Braille pattern by means of apertures 7 and indentations 15. The information so impressed is selected by the "writer" but would probably include the check number, payee, data and amount. Because Braille is "read" with the projections upward its is necessary that the information be impressed in reverse form, but this is an acquired skill of many people familiar with Braille.

After completing the check the blind person then enters the appropriate information by means of Braille into the stub and removes the check from between the pattern plates. The cutout 9 on the side of plate 1 assists in removal. The check may then be detached and negotiated.

Upon return of the check from the bank the blind person can sort and file his own checks by means of the embossed Braille dots. It has been found that in spite of repeated processing and handling the Braille dots remain sufficiently raised to allow a blind person to retrieve the information. The Braille dots do not interfere with the normal sorting and handling by the bank, including such handling by machine.

Apertures 7 and related indentations 15 for Braille writing are normally placed along the side of plates 1 and 12 corresponding to the top portion of the check to avoid interference of the Braille indentations with the longhand information usually found in the middle of the check and the magnetic numbers, which most United States banks use, normally found along the bottom edge of the check. While a particular embodiment of the device has been described herein it is appearant that the location of the apertures can be varied to accommodate different check arrangements based on local requirements and suitable adjustments may be made for different check stub locations.

I claim:

1. A device to enable a blind person to manage a checking account by enabling him to compare a returned check with other records without the assistance of a sighted person comprising in combination a first pattern plate designed to fit below the check, said first plate having a series of groups of indentations the said groups corresponding to Braille characters; a second pattern plate attached to the first plate, said second plate having a series of apertures corresponding in size to Braille characters and corresponding in location to each of the said groups of indentations on the first plate, said second plate having a further series of apertures corresponding to the location of the portion of a check normally written by hand, whereby a blind person may by use of this device impress Braille information on the check and in addition locate and enter the required longhand information; a spacer between said first plate and said second plate; and stop means along a side of said spacer, said stop means limiting the extent of insertion of a check between the said first plate and the said second plate.

2. The device of claim 1 further comprising in combination means for impressing Braille characters on a check stub associated with said check, said means including a further series of indentations corresponding to Braille characters, said indentations located on the first plate in the stub area and a further series of apertures corresponding to Braille characters, said apertures located in the second plate above the said further series of indentations in the first plate.

3. The device of claim 1 in which the dimension of one axis of at least one of said pattern plates is the same as the dimension of the corresponding axis of the check with which said device is used.

4. The device of claim 1 in which there is a space of at least the thickness of a check with which said device is to be used between said first plate and said second plate adjacent to said stop means.

5. The device of claim 4 further comprising in combination means for impressing Braille characters on a check stub associated with said check, said means including a further series of indentations corresponding to Braille characters, said indentations located on the first plate in the stub area and a further series of apertures corresponding to Braille characters, said apertures located in the second plate above the said further series of indentations in the first plate.

References Cited

UNITED STATES PATENTS

| | | | |
|---|---|---|---|
| 2,850,812 | 9/1958 | Manheimer | 35—38 |
| 2,913,836 | 11/1959 | Strunk | 35—38 |

ROBERT E. PULFREY, *Primary Examiner.*

F. A. WINANS, *Assistant Examiner.*